United States Patent
Schillinger et al.

(10) Patent No.: US 7,536,903 B2
(45) Date of Patent: May 26, 2009

(54) SENSOR TRANSPONDER AND PROCEDURE FOR MEASURING TIRE CONTACT LENGTHS AND WHEEL LOAD

(75) Inventors: Jakob Schillinger, Gaimersheim (DE); Rainer Von Lutz, Kirchheim (DE); Adrian Cyllik, Hannover (DE); Joerg Lehmann, Hannover (DE)

(73) Assignees: Conti TEMIC microelectronic GmbH, Nuremberg (DE); Continental AG, Hannover (DE)

( * ) Notice: Subject to any disclaimer, the term of this patent is extended or adjusted under 35 U.S.C. 154(b) by 0 days.

(21) Appl. No.: 10/582,538

(22) PCT Filed: Dec. 13, 2004

(86) PCT No.: PCT/DE2004/002773

§ 371 (c)(1),
(2), (4) Date: Jun. 9, 2006

(87) PCT Pub. No.: WO2005/056311

PCT Pub. Date: Jun. 23, 2005

(65) Prior Publication Data
US 2007/0107505 A1      May 17, 2007

(30) Foreign Application Priority Data
Dec. 11, 2003   (DE)   ................. 103 58 277

(51) Int. Cl.
*B60C 23/02*   (2006.01)

(52) U.S. Cl. ......................................... 73/146.5; 701/1
(58) Field of Classification Search .................. 73/146, 73/146.5; 701/1
See application file for complete search history.

(56) References Cited

U.S. PATENT DOCUMENTS

| | | | |
|---|---|---|---|
| 4,246,567 A | 1/1981 | Miller | |
| 2003/0058118 A1 | 3/2003 | Wilson | |
| 2003/0062994 A1 | 4/2003 | Morand et al. | |
| 2003/0197604 A1* | 10/2003 | Ogawa et al. | 340/445 |
| 2004/0130442 A1* | 7/2004 | Breed et al. | 340/443 |
| 2005/0192727 A1* | 9/2005 | Shostak et al. | 701/37 |
| 2005/0273218 A1* | 12/2005 | Breed et al. | 701/2 |
| 2006/0025897 A1* | 2/2006 | Shostak et al. | 701/1 |
| 2006/0164214 A1* | 7/2006 | Bajahr | 340/10.41 |
| 2006/0195233 A1* | 8/2006 | Ogawa et al. | 701/2 |
| 2006/0249323 A1* | 11/2006 | Kurata | 180/233 |
| 2007/0080795 A1* | 4/2007 | Ichikawa et al. | 340/447 |

FOREIGN PATENT DOCUMENTS

DE       44 02 136       7/1995

* cited by examiner

*Primary Examiner*—Andre J Allen
(74) *Attorney, Agent, or Firm*—W. F. Fasse; W. G. Fasse

(57) ABSTRACT

A sensor transponder (1) with at least one acceleration sensor is arranged on the inner side of a running surface (2) of a tire (9). The signals from the acceleration sensor are compared with prespecified threshold values and then integrated, whereby following the formation of a quotient, the tire contact length (6) is calculated independently of the velocity.

6 Claims, 3 Drawing Sheets

SENSOR TRANSPONDER AND PROCEDURE FOR MEASURING TIRE CONTACT LENGTHS AND WHEEL LOAD

FIELD OF THE INVENTION

The present invention relates to a sensor transponder and a procedure for measuring tire contact lengths and wheel load.

BACKGROUND INFORMATION

A sensor transponder which is arranged in the vehicle tire is already known from the German patent DE 44 02 136 C2, which comprises an acceleration sensor and a temperature sensor.

A sensor transponder with a pressure sensor is known from U.S. Pat. No. 4,246,567.

SUMMARY OF THE INVENTION

The object of the invention is the simple and cost-effective calculation of the tire contact area, since as the "effective" contact area between the tire and the road, this significantly influences both the traction behavior (the force transmission behavior, braking behavior) as well as the friction loss resulting from flexing. The object is furthermore to produce a suitable device for this purpose.

This object is attained by means of a sensor transponder with the features, and a related procedure with the features, as disclosed herein. The invention provides a sensor transponder with at least one acceleration sensor and a facility for transmitting measurement data from a tire to a receiving facility, characterized in that the sensor transponder is fitted on an inner side of the running surface of the tire. The invention further provides a procedure for calculating a tire contact length, whereby a sensor transponder is fitted with at least one acceleration sensor arranged on the inner side of a running surface of a tire, the signals from the acceleration sensor are compared with threshold values and are then integrated, and the tire contact length is calculated independently of the velocity using quotient formation.

BRIEF DESCRIPTION OF THE DRAWINGS

In the description below, the features and details of the invention will be described in greater detail using exemplary embodiments and with reference to the appended drawings. Here, the features and relationships described in the individual variants also apply in principle to all exemplary embodiments. In the drawings

DETAILED DESCRIPTION OF EXAMPLE EMBODIMENTS OF THE INVENTION

Figure 1:
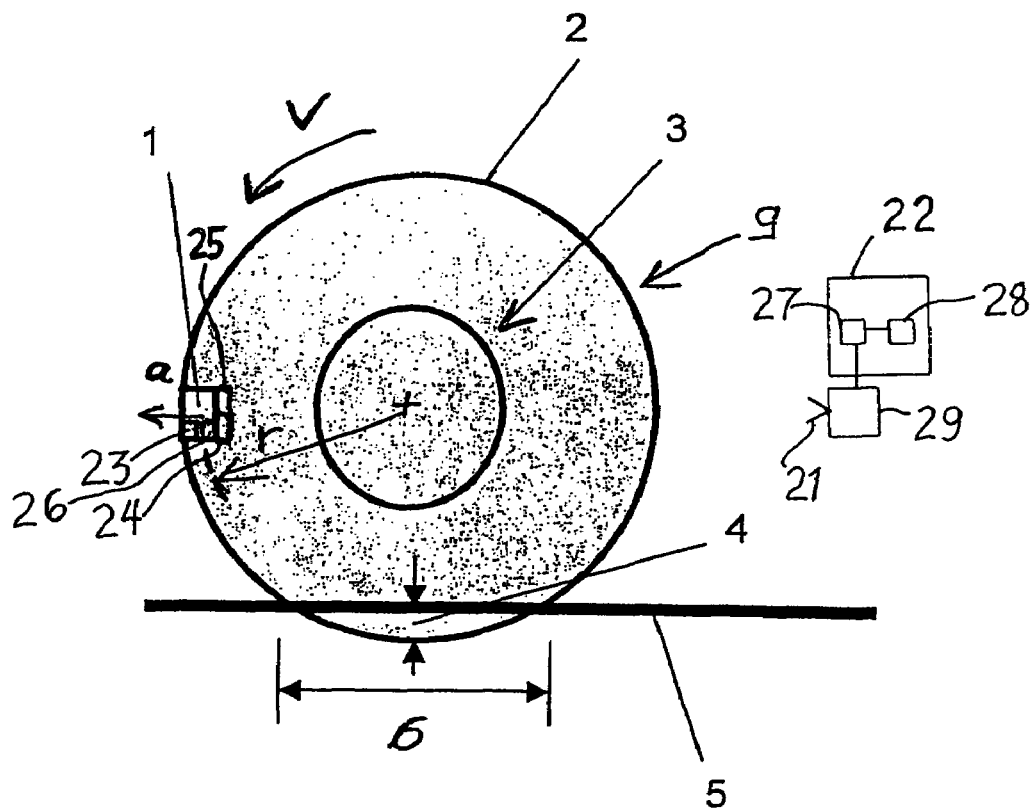
FIG. 1 shows a schematic view of an arrangement of a sensor transponder according to the invention with an acceleration sensor in one tire.

According to FIG. 1, a transponder or sensor transponder 1 for measuring a tire contact length 6 is attached in accordance with the invention on the inner side of a tire running surface 2. Using the transponder 1, data for one or more transmission and receiving antennas 21 of a receiving unit 29 which are arranged on the vehicle for example can be transmitted in a wireless manner. This data can then be transmitted, for example, to a superordinate central unit 22 as a digital value, or also as a signal (phase, frequency, amplitude or load modulation) which is modulated onto a HF carrier. Advantageously, but not necessarily, using a comparator 27 and a integrator 28, a comparison and integration can be made in the central unit 22 in particular between the individual data or signals and for example a correction of the tire type, the temperature, the tire pressure etc. and this can be forwarded to a superordinate system.

The transponder 1 comprises at least one acceleration sensor 23. The acceleration can be measured according to a capacitive (micromechanical, spring-mass areas), piezoresistive (micromechanical, DMS seismic mass), ferroelectric (magnetic flux change), inductive (spring-magnet induction), electrodynamic (spring-electromagnet) or piezoelectric principle (material: in particular quartz, piezo ceramic or piezo foil; procedure: in particular bending, axial, torsion or shear strain).

With measuring principles which additionally have a generatory effect, such as the piezoelectric principle, the acceleration energy can also supply energy to the transponder 1 and charge an electric buffer storage. In particular when sufficient energy is produced, the measurement signals can be transmitted to the receiving antenna or the central unit.

At least one acceleration sensor can also be used for triggering the signal transmission, since in order to reduce the load on a battery, a measurement is only important or advantageous while driving. In addition, the angle position of the sensor transponder 1 can be calculated, and this knowledge can be used to determine a suitable point in time for the optimum overlap of the corresponding transmission and receiving antenna(e).

According to FIG. 1, a countersink or deflection 4 of the tire 2 is determined by the wheel load, the tire type (dimensions, design, material etc.) and the internal pressure in the tire. This countersink 4 results in a specific tire contact length 6 on a road 5.

Figure 2:
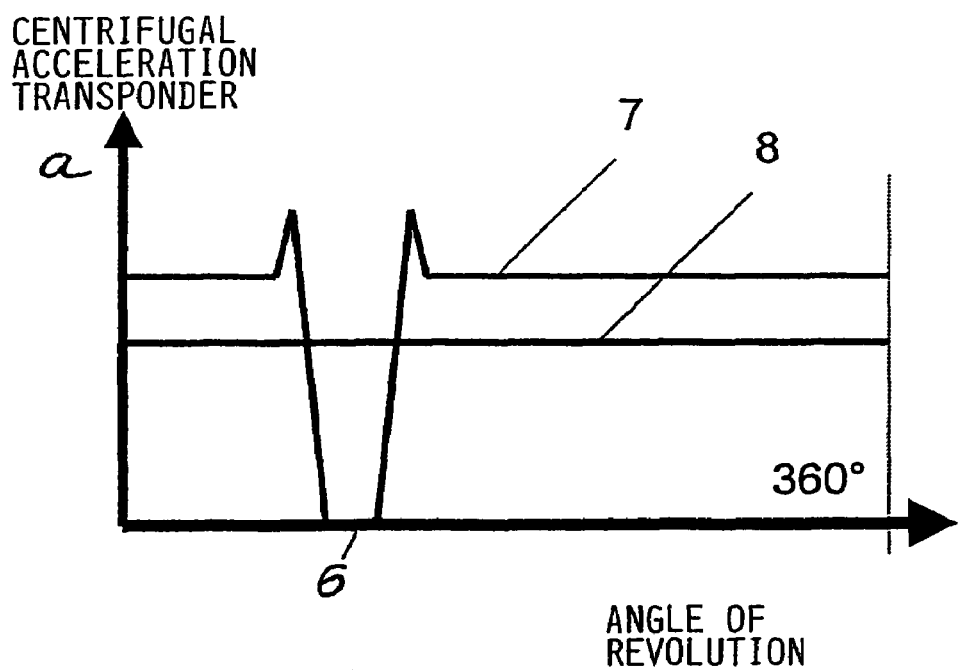
FIG. 2 shows a diagram in which the progression of the centrifugal acceleration is shown with respect to the angle of revolution or rotation of the tire.

Due to its attachment on the inner side of the running surface 2, the transponder 1 is exposed to the progress 7 of the centrifugal acceleration a, represented in FIG. 2 as a complete revolution, i.e. an angle of rotation of between 0° and 360°. By contrast, were a sensor transponder purely theoretically mounted to a wheel rim 3, the continuous progress 8 of the centrifugal acceleration a, which is also represented in FIG. 2, would be effective.

The centrifugal acceleration a is calculated using the following known formula:

$$a = v^2/r$$

This means that the centrifugal acceleration a with a constant radius r (were the transponder to be arranged on the wheel rim 3) and a constant velocity v is also constant (acceleration progression 8). In the area of the tire contact length 6, due to the fact that it is mounted onto the inner side of the tire running surface 2, no centrifugal acceleration 7 affects the sensor transponder 1, since here, the radius r tends to infinity. When the sensor transponder 1 enters the area of the tire contact length 6, the radius r initially decreases, leading here to acceleration peaks. The same principle applies when the sensor transponder 1 exits the area of the tire contact length 6.

For measuring purposes, the tire contact length or tread footprint length 6 can be calculated according to the invention by evaluating the centrifugal acceleration 7 of the sensor transponder 1 shown in FIG. 2. Here, initially at least one acceleration sensor is used to record the time or angle-dependent progress of the acceleration a, which is converted into a corresponding voltage progression. Using a threshold and gradient evaluation explained in relation to FIGS. 3 and 4, the tire contact length 6 which is relative to the full revolution and independent of the velocity can be calculated.

Knowledge of the tire type can also be used to calculate to an adequate degree of accuracy the tire contact area (tread). A further important variable, the wheel load, can then be calculated with the aid of the pressure in the inner tire, the temperature and the tire contact area.

By comparing these individual results (tire contact length 6, wheel load, tire contact area) for all of the tires, i.e. all wheels, a conclusion can be advantageously reached regarding the tire pressures that are incorrect relative to each other and/or which are absolutely. Furthermore, the wheel load and the tire contact length 6 can be tested against prespecified limit values, and any excess of these values can be stored and, if necessary, displayed. In the further embodiment of the present invention, this information can for example be made available for a drive train electronic system for optimizing the engine-transmission setting, or for a chassis electronic system for setting the damper-spring characteristics, and/or an electronic brake for adapting the brake coefficients.

The absolute (time-related) or relative (angle-related) tire contact length 6 can for example be transmitted for this purpose to the superordinate central unit as a digital value, or as a signal (phase, frequency, amplitude or load modulation) which has been modulated onto the HF carrier.

The evaluation can be conducted, for example, in the manners described below with reference to FIGS. 3 and 4. According to FIG. 3, with a DC-compatible (DC=direct current) acceleration sensor with low-pass behavior, the centrifugal acceleration 10 is detected with an acceleration sensor (output signal 11) and digitalized with the aid of a comparator threshold 12. Not shown in FIG. 3 are for example superimposed vertical accelerations which may arise as a result of the quality of the road 5 (FIG. 1).

The output signal 13 of the comparator controls an integrator 14 which can be realized in analog (op-amp and/or RC elements) or digital (counter) technology, and the tread-length-controlled end value of which (marked by the bold arrows 16) is stored until the end of the period. With the respective positive flank of the comparator output, a further integrator 15 is started, stopped and stored. Its output signal (marked by bold arrows 16) represents a value for the duration of revolution of the tire 9. The quotient formation of the signals 14 and 15 or this voltage ratio produce the relative tire contact length 6 which is related to the tire circumference, and which is thus independent of the velocity v or the rotational speed. Instead of the integrator 15, the rotational speed of the wheel can also be, used in the calculation.

Figure 3:
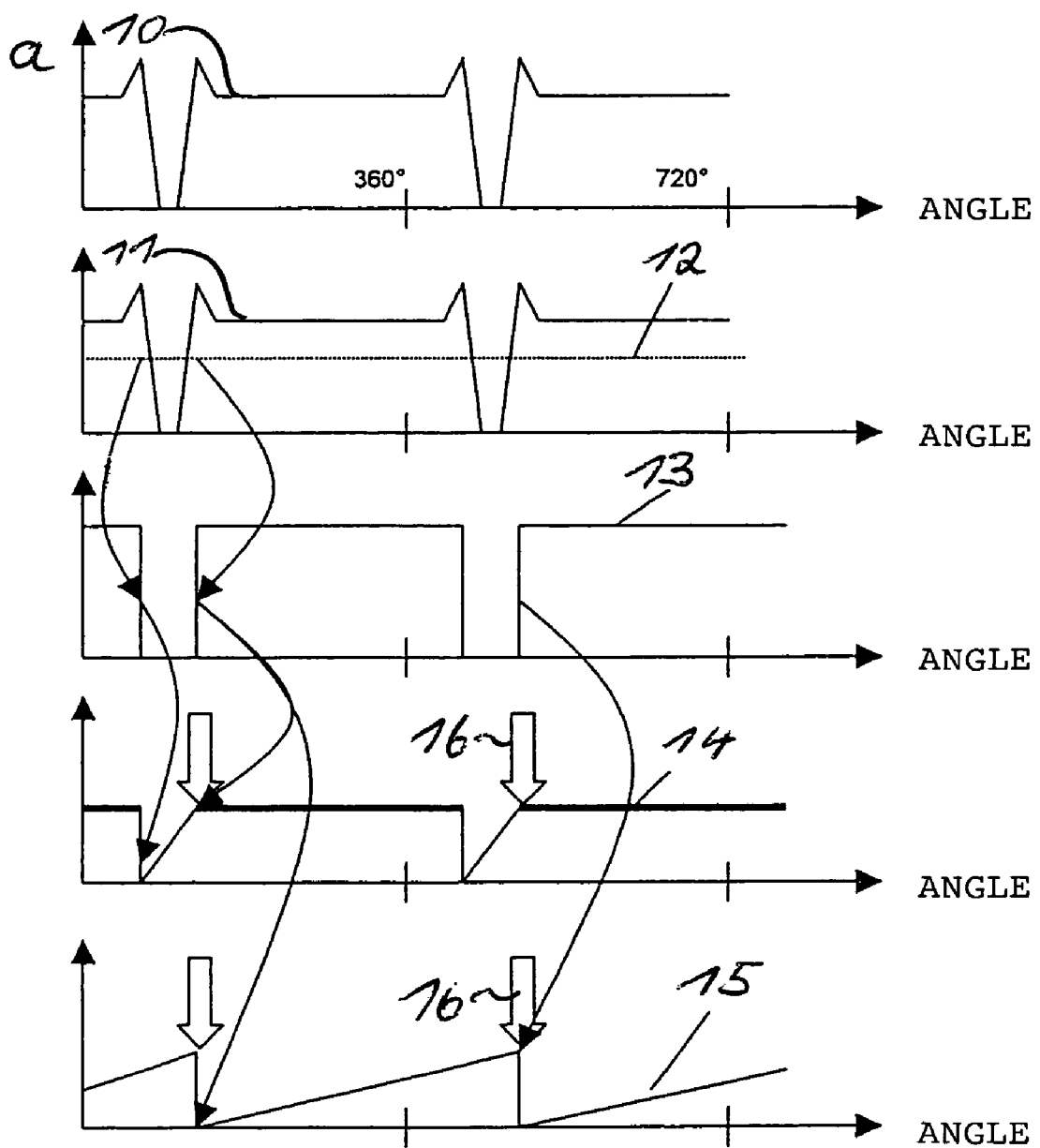
FIG. 3 shows five further diagrams for evaluating the signals from the sensor transponder for an acceleration sensor with low-pass behavior according to a first embodiment of the invention.
Figure 4:
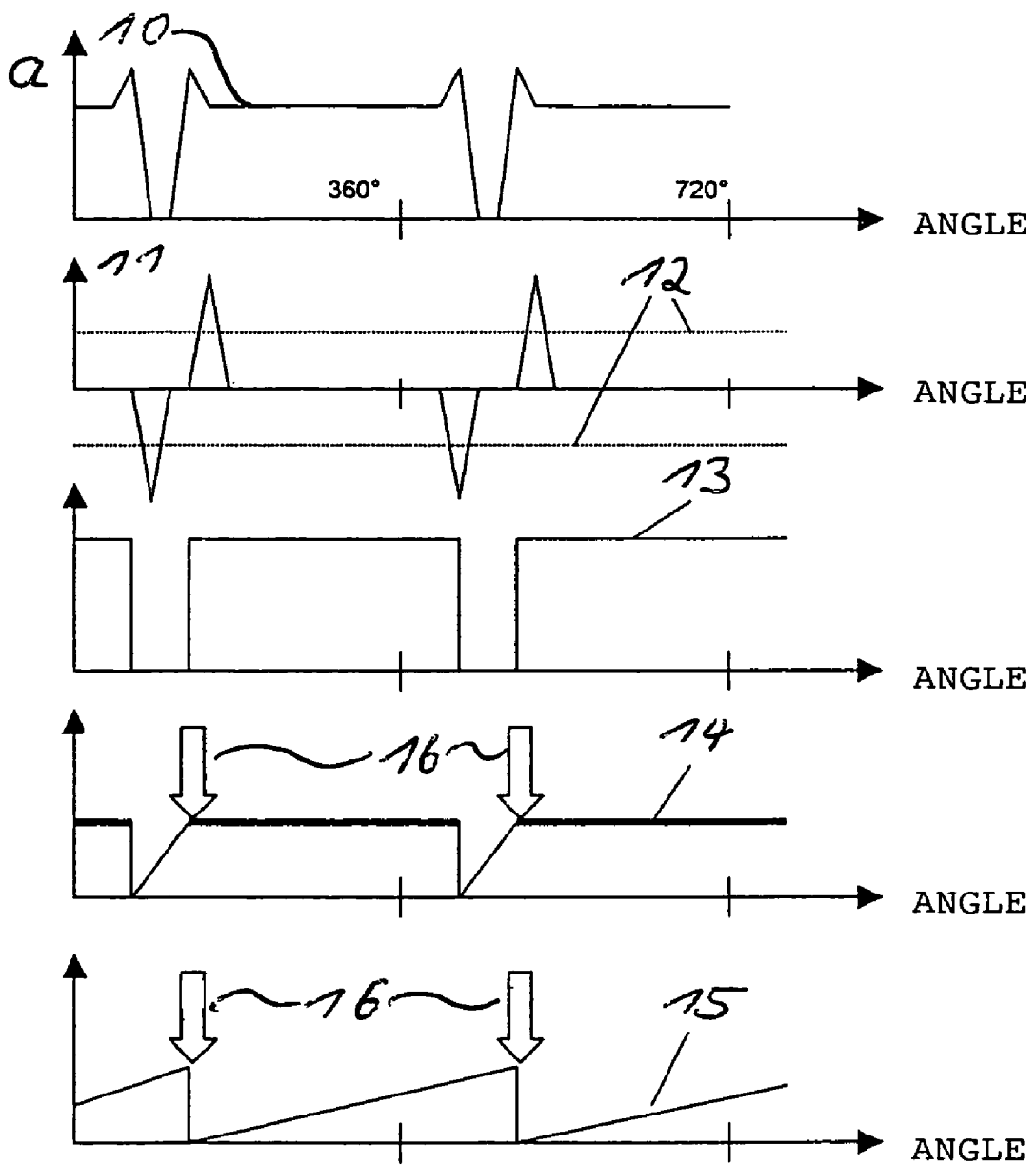
FIG. 4 shows five diagrams for evaluating the signals from the sensor transponder for an acceleration sensor with differentiating behavior according to a second embodiment of the present invention.

The signal evaluation of an alternative, non DC-compatible acceleration sensor with differentiating behavior is represented in FIG. 4, whereby identical or similar components or signal progressions are assigned the same reference numerals as in FIG. 3. Here, the output signal 11 of the acceleration sensor is compared against threshold values and evaluated in a comparable or similar manner. In particular, the quotient or ratio formation of the signals 14 and 15 is achieved, as a result of which the tire contact length 6 can be calculated independently of the velocity v.

These two procedures according to the invention directly calculate the tire contact length 6, but knowledge of the tire type can further be used to calculate to an adequate degree of accuracy the tire contact area (tread). A further important variable, the wheel load, can be calculated with the aid of the internal pressure in the tire, the temperature and the tire contact area. With the aid of the sensor transponder 1 according to the invention, and in particular its particular arrangement, the relevant data can be obtained. Therefore according to the invention, in an advantageous manner, the tire contact area and the wheel load can be calculated from the tire contact length 6 via its relationship to or dependence on the pressure in the inner tire, the rotational speed of the wheel and/or the type of tire used.

In a preferred, full construction stage, the sensor transponder 1 preferably also comprises, alongside at least one acceleration sensor 23, sensors for temperature 24 and pressure 25, and a memory 26 for tire-specific parameters.

The essential features and advantageous further embodiments of the sensor transponder 1 according to the invention will again be described below. The transponder 1 is mounted according to the invention on the inner side of the running surface 2 of the tire 9. It comprises at least one acceleration sensor 23 for the measurement of the tire contact length 6 described above. In addition, a memory 26 for the tire-specific parameters for calculating the tire contact area can be integrated on the sensor transponder 1. Furthermore, the transponder 1 comprises as an option a pressure sensor 25 for monitoring the tire pressure and calculating the wheel load. In addition, a temperature sensor 24 for measuring the temperature and correcting the measurement values can be fitted on the sensor transponder.

LIST OF REFERENCE NUMERALS

1 Sensor transponder
2 Tire running surface
3 Wheel rim
4 Countersink
5 Road
6 Tire contact length
7 Centrifugal acceleration
8 Centrifugal acceleration
9 Tires
10 Centrifugal acceleration
11 Output signal, acceleration sensor
12 Comparator threshold
13 Output signal, comparator
14 Integrator
15 Integrator
16 End value or output signal (bold arrows)
21 Receiving antenna
22 Central unit
23 Acceleration sensor
24 Temperature sensor
25 Pressure sensor
26 Memory
27 Comparator
28 Integrator
29 Receiving unit a Centrifugal
r Radius
v Velocity

The invention claimed is:

1. A procedure for calculating a tire contact length (6), whereby a sensor transponder (1) is fitted with at least one acceleration sensor arranged on the inner side of a running surface (2) of a tire (9), the signals from the acceleration sensor are compared with threshold values and are then integrated, and the tire contact length (6) is calculated independently of the velocity using quotient formation.

2. The procedure according to claim 1, characterized in that the tire contact area (tread) is calculated from the tire contact length (6) using tire-specific parameters.

3. The procedure according to claim 2, characterized in that the wheel load is calculated using the tire contact area and the tire pressure.

4. A method of calculating at least a tire contact length of a rotating tire of a vehicle, comprising the steps:
   a) as the tire rotates, measuring acceleration data of the tire using an acceleration sensor arranged on the tire;
   b) transmitting measured data comprising said acceleration data to a receiver arrangement, and providing said measured data from said receiver arrangement to a central unit comprising an evaluation unit arranged in the vehicle;
   c) in said evaluation unit evaluating said acceleration data to determine therefrom a first result dependent on a duration of said acceleration sensor passing through said tire contact length during one rotation of the tire and a second result indicative of a duration of said one rotation of the tire, wherein said evaluating comprises comparing said acceleration data to a threshold and integrating said acceleration data dependent on said comparing; and
   d) forming a quotient of said first result relative to said second result to determine said tire contact length relative to a circumference of the tire and independent of a tire rotation speed of the rotation of the tire.

5. The method according to claim 4, further comprising a step of calculating a tire contact area of the tire from said tire contact length and at least one tire-specific parameter of the tire.

6. The method according to claim 5, further comprising measuring an air pressure in the tire and providing corresponding pressure data as part of said measured data to said central unit, and calculating a wheel load of the tire from at least said tire contact area and said pressure data.

* * * * *